US007032170B2

(12) United States Patent
Poulose et al.

(10) Patent No.: US 7,032,170 B2
(45) Date of Patent: Apr. 18, 2006

(54) CREATING DATA STRUCTURES FROM A FORM FILE AND CREATING A WEB PAGE IN CONJUNCTION WITH CORRESPONDING DATA STRUCTURES

(75) Inventors: Asha Poulose, Kerala (IN); Rajasekhar Kalahasthi, Andhra Pradesh (IN); Neeraj Bharti, Punjab (IN); Michael Steven Olle, Kennesaw, GA (US)

(73) Assignee: General Electric Company, Schenectady, NY (US)

( * ) Notice: Subject to any disclaimer, the term of this patent is extended or adjusted under 35 U.S.C. 154(b) by 556 days.

(21) Appl. No.: 10/159,010

(22) Filed: Jun. 3, 2002

(65) Prior Publication Data

US 2004/0205529 A1    Oct. 14, 2004

(51) Int. Cl.
G06F 7/00        (2006.01)
(52) U.S. Cl. ...................... 715/513; 715/505; 715/506; 715/760
(58) Field of Classification Search ................ 715/503, 715/505–508, 760, 513
See application file for complete search history.

(56) References Cited

U.S. PATENT DOCUMENTS

| 5,890,177 | A | * | 3/1999 | Moody et al. | 715/511 |
| 5,960,411 | A | | 9/1999 | Hartman | 705/26 |
| 5,974,572 | A | | 10/1999 | Weinberg | 714/47 |
| 5,995,756 | A | | 11/1999 | Herrmann | 717/178 |
| 6,128,622 | A | | 10/2000 | Bach | 707/103 R |
| 6,330,574 | B1 | * | 12/2001 | Murashita | 715/513 |
| 2002/0099829 | A1 | * | 7/2002 | Richards et al. | 709/227 |
| 2003/0110315 | A1 | * | 6/2003 | Upton | 709/328 |
| 2004/0217985 | A9 | * | 11/2004 | Ries et al. | 345/740 |

OTHER PUBLICATIONS

Lemay, "Laura Lemay's Workshop JavaScript", Sams.net, 1996, pp. 132-137.*
Lewis, Adobe Pagemill 2.0 Handbook, Hayden Books, 1996, pp. 16-22, 197-204, 311-318.*
"Great Plains Ships Profit 2.0, Payroll for Profit," Newsbytes News Networks; Jan. 31, 1995 ABST.
"OmniForm 2.0 adds more function to forms," review by InfoWorld, Feb. 19, 1996 ABST.
"Beta Testers Praise dBase for Windows," review by InfoWorld, vol. 16, No. 11, Apr. 4, 1994 ABSTR.
"VBAssist Enhances Visual Basic Programming," review by InfoWorld, vol. 15, No. 33; Aug. 23, 1993 ABST.
"ERwin streamlines GUI and adds versatile features," evaluation by InfoWorld, vol. 19, No. 29, Jul. 21, 1997 ABST.

(Continued)

*Primary Examiner*—Cesar B Paula
(74) *Attorney, Agent, or Firm*—Hunton & Williams

(57) ABSTRACT

The invention provides a system and method for creating a form. The method includes providing a graphical user interface including a plurality of selectable components and a design space; a creator selecting at least one of the selectable components and disposing each of the selected selectable components in the design space to generate a form layout; converting the form layout to data information; and saving the data information to a form file, the form file being output to a database over a network.

23 Claims, 10 Drawing Sheets

OTHER PUBLICATIONS

"Easy accounting pays off," evaluation by Windows Magazine, vol. 6, No. 1, Jan. 1995 ABST.

"A major database comes of age. (Software Review)," evaluation by Computer Shopper, vol. 14, No. 8, Aug. 1994 ABSTR.

"Tap the wizardry of Access. (usage of Microsoft Corp.'s Access database management system's Report Wizard and Form Wizard)," by Data Based Advisor, vol. 11, No. 2, Feb. 1993 ABSTR.

"4th Dimension 6.0," journal article by Macworld, vol. 14, No. 8; 97/08/00 ABSTR.

"Visual Café boosts Java development," journal article by Informationweek, No. 615, Jan. 27, 1997, pp. 60 ABSTR.

"Write here, right now Y desktop publishing," journal paper by Mind Your Own Business, vol. 20, No. 10, Nov. 1977 ABSTR.

"Free-Form Phenomenon," evaluation by WinMag.com, Feb. 20, 2001.

"Free-Form Phenomenon," evaluation by WinMag.com, Feb. 15, 2001.

"Free-Form Phenomenon," evaluation by WinMag.com, Feb. 14, 2001.

"Free-Form Phenomenon," evaluation by WinMag.com, Feb. 13, 2001.

"Forms Wizard," service mark, Oct. 16, 2000 ABSTR.

* cited by examiner

| Menu Option | Sub Menus | Function |
| --- | --- | --- |
| File | New | Opens new design space |
| | Open for Reuse | Opens approved forms for reusing component/layout |
| | Open for Edit | Opens a form that is previously saved for editing |
| | Open for Translation | Opens a approved form for translation |
| | Open for Approval | Opens a form for approval |
| | Save | Save the current Form |
| Edit | Cut | Cuts the selected component /Components |
| | Copy | Copies the selected component /Components |
| | Paste | Pastes the cut/copied component /Components into the same/different design space |
| | Select All | Selects all components on the design space |
| Layout | Align | Aligns the components to the one in primary selection – left, right, top, bottom alignments possible |
| | Make Same Size | Makes the components as the same size as in primary selection – horizontal, vertical or both possible |
| | Space Evenly | Spaces the Components evenly |
| Actions | Send For Approval | Sends the form for approval |
| | Approve | Approves the form |
| | Send For Revision | Disapproves the form and sends it to Planner with Comments |
| | Deploy | Deploys the form on a Web server |
| Window | Cascade | Windows arranged in Cascade |
| | Tile Vertically | Windows tiled vertically |
| | Tile Horizontally | Windows tiled Horizontally |
| | Next | Goes to Next window |
| | Previous | Goes to Previous window |
| | Close All | Closes all open windows |
| | Windows | Lists all the open windows |
| Help | Forms Wizard Help | Provides help on Forms Wizard |

| Component \ Properties | Text Area | Text Field | List | Check Box | Radio Button | Combo Box | Label | Audio | Video | Image | Table | Date |
|---|---|---|---|---|---|---|---|---|---|---|---|---|
| Name | Y | Y | Y | Y | Y | Y | Y | Y | Y | Y | Y | Y |
| Text | Y | Y | N | Y | Y | N | Y | Y | Y | N | N | N |
| Foreground Color | Y | Y | Y | Y | Y | Y | Y | Y | Y | N | N | Y |
| Background Color | Y | Y | Y | Y | N | Y | N | N | N | N | N | N |
| Font | Y | Y | Y | Y | Y | Y | Y | N | N | N | N | N |
| Width | Y | Y | Y | Y | Y | Y | Y | Y | Y | Y | Y | Y |
| Height | Y | Y | Y | Y | Y | Y | Y | Y | Y | Y | Y | N |
| X-Location | Y | Y | Y | Y | Y | Y | Y | Y | Y | Y | Y | Y |
| Y-Location | Y | Y | Y | Y | Y | Y | Y | Y | Y | Y | Y | Y |
| Enabled | Y | N | N | N | N | N | N | N | N | N | N | N |
| Requires Input | Y | Y | N | N | N | N | N | N | N | N | N | N |
| Input Type | N | Y | N | N | N | N | N | N | N | N | N | N |
| Character Length | N | Y | N | N | N | N | N | N | N | N | N | N |
| Units | N | Y | N | N | N | N | N | N | N | N | N | N |
| Formula | N | Y | N | N | N | N | N | N | N | N | N | N |
| Options | N | N | Y | N | N | Y | N | N | N | N | N | N |
| Text Location | N | N | N | Y | Y | N | N | N | N | N | N | N |
| Layout | N | N | N | N | Y | N | N | N | N | N | N | N |
| No's | N | N | N | N | Y | N | N | N | N | N | N | N |
| Border Color | N | N | N | N | N | N | N | Y | Y | N | N | N |
| Border Width | N | N | N | N | N | N | N | Y | Y | Y | N | N |
| File | N | N | N | N | N | N | N | Y | Y | Y | N | N |
| Rows | N | N | N | N | N | N | N | N | N | N | Y | N |
| Columns | N | N | N | N | N | N | N | N | N | N | Y | N |
| Row Height | N | N | N | N | N | N | N | N | N | N | Y | N |
| Edit | N | N | N | N | N | N | N | N | N | N | Y | N |
| Month | N | N | N | N | N | N | N | N | N | N | N | Y |
| Day | N | N | N | N | N | N | N | N | N | N | N | Y |
| Year | N | N | N | N | N | N | N | N | N | N | N | Y |

Fig. 5

CREATING DATA STRUCTURES FROM A FORM FILE AND CREATING A WEB PAGE IN CONJUNCTION WITH CORRESPONDING DATA STRUCTURES

The invention is directed to a world wide web (web) based software tool to generate web based data forms allowing later use on the web, while avoiding programming requirements of users.

BACKGROUND OF THE INVENTION

Technology is continually moving further towards a completely digitized and web based process. However, the use of and need for "data forms" continues in this technological move. Currently, these forms are generated electronically using software applications such as Microsoft Word or Excel. These forms are typically incorporated for use, in paper format where the user fills in data required by hand. Also, when a new type of inspection process is implemented in a company or a new business need arises, for example, it is necessary to create further data forms associated with that process or need.

A further requirement often desired is that data forms are standard across the world and translated to different languages, i.e., since the users of these forms are geographically located in various countries around the world. Creating a web based data form manually, i.e., by the use of web technologies and software personnel, is a tedious and time-consuming process. For example, to create an average form with around 20 to 30 data fields, it may well take a software programmer with good skills in Java, JSP and eMatrix approximately five days. Additionally, creating the pages requires a skilled "programmer" versus the typical skill set of basic computer application knowledge.

Further, the paper forms currently used provide no capability for "data quality" verification or fool proofing of data entered. The workflow associated with the form creation, such as approval and deployment, needs to be done explicitly. In order to translate the form to another language the above-mentioned process has to be repeated for each language in which the form needs to be made available. Considering the fact that translations often need to be done for numerous languages, the resources needed, i.e., in terms of time, money and skilled manpower, is enormous.

At present, to a limited extent, the problem has been addressed by manually creating the web forms. This is a tedious process and following are the steps typically required, illustratively using known technologies. A developer might first create a data structure in an eMatrix database, for example, for capturing the data. Then the developer creates the web page by using JSP/Java, including the required validation scripts, field properties and layout for example. Then, it would further be required to develop the code required for connecting the web page fields to the data structure using Java and ADK 4, for example. Once the form is created it is sent for approval to the approver.

In case the approver suggests any modifications, the form has to be reworked to include those suggestions. Then, once the form is finally approved by the approver, the form has to be deployed on a Web Server for access from a website. This is again done manually. If the form has to be created in another language, the above steps have to be repeated for each language.

As should be appreciated, the above process takes a skilled software programmer a substantial amount of time. Further, the process allows for manual errors like missing a field in the data structure, duplication of fields leading to erroneous data capture, incorrect or incomplete validation scripts, etc., for example. Thorough testing is mandatory after the form creation. Further, global standardization of forms is difficult to achieve using this process.

BRIEF SUMMARY OF THE INVENTION

The invention provides a system and method for creating a form. In accordance with one embodiment, the invention provides a method for creating a form comprising providing a graphical user interface including a plurality of selectable components and a design space; a creator selecting at least one of the selectable components and disposing each of the selected selectable components in the design space to generate a form layout; converting the form layout to data information; and saving the data information to a form file, the form file being output to a database over a network. Accordingly, the form file is converted to a data form deployed on an application server over the web.

In accordance with a further embodiment of the invention, the invention provides a system for creating a form comprising a web browser, the web browser providing a graphical user interface including a plurality of selectable components and a design space, the graphical user interface providing for a user to select at least one of the selectable components and to dispose each of the selected selectable components in the design space to generate a form layout that represents the form, the web browser converting the form layout to data information; a web server, the web server saving the data information to a form file; and a database, the form file being output to the database over a network.

In accordance with one embodiment of the invention, the invention provides a method for creating a form comprising: providing a graphical user interface including a plurality of selectable components and a design space; a creator selecting at least one of the selectable components and dragging each of the selected selectable components into the design space to generate a form layout, the user selecting a property of at least one of the selected selectable components; converting the form layout to data information; saving the data information to a form file, the form file being output to a database over a network, the saving the data information to a form file including providing the form file to a web server, the web server outputting the form file to the data base; and retrieving the form file from the database, the data information in the form file including text information and coordinate information; reading the form file and creating corresponding data structures based on reading the form file; and reading the form file and creating a web page, the web page created in conjunction with linking the web page with the corresponding data structures.

In accordance with one embodiment of the invention, the invention provides a system for creating a form comprising a web browser, the web browser providing a graphical user interface including a plurality of selectable components and a design space, the graphical user interface providing for a user to select at least one of the selectable components and to dispose each of the selected selectable components in the design space to generate a form layout that represents the form, the web browser converting the form layout to data information; a web server, the web server saving the data information to a form file; and a database, the form file being output from the web server to the database over a network; and wherein the data information includes text information and coordinate information; and wherein the form file is read by a database parser and corresponding data structures are created based on reading the form file; and the form file is read by a language parser and a web page is created, the web page created in conjunction with linking the web page with the corresponding data structures; and wherein the providing for a user to select at least one of the selectable components and to dispose each of the selected selectable components in the design space includes dragging a selected selectable component into the design space.

BRIEF DESCRIPTION OF THE DRAWINGS

The present invention can be more fully understood by reading the following detailed description together with the accompanying drawing, in which like reference indicators are used to designate like elements, and in which:

FIG. 3 is a table showing menu options provided by the form tool in accordance with one embodiment of the invention;

FIG. 4 is a browser showing a form, generated by the forms tool, after deployment over the web in accordance with one embodiment of the invention.

FIG. 5 is a table showing selectable components provided to a creator (user) and properties associated with those components in accordance with one embodiment of the invention;

DETAILED DESCRIPTION OF THE INVENTION

Figure 1:
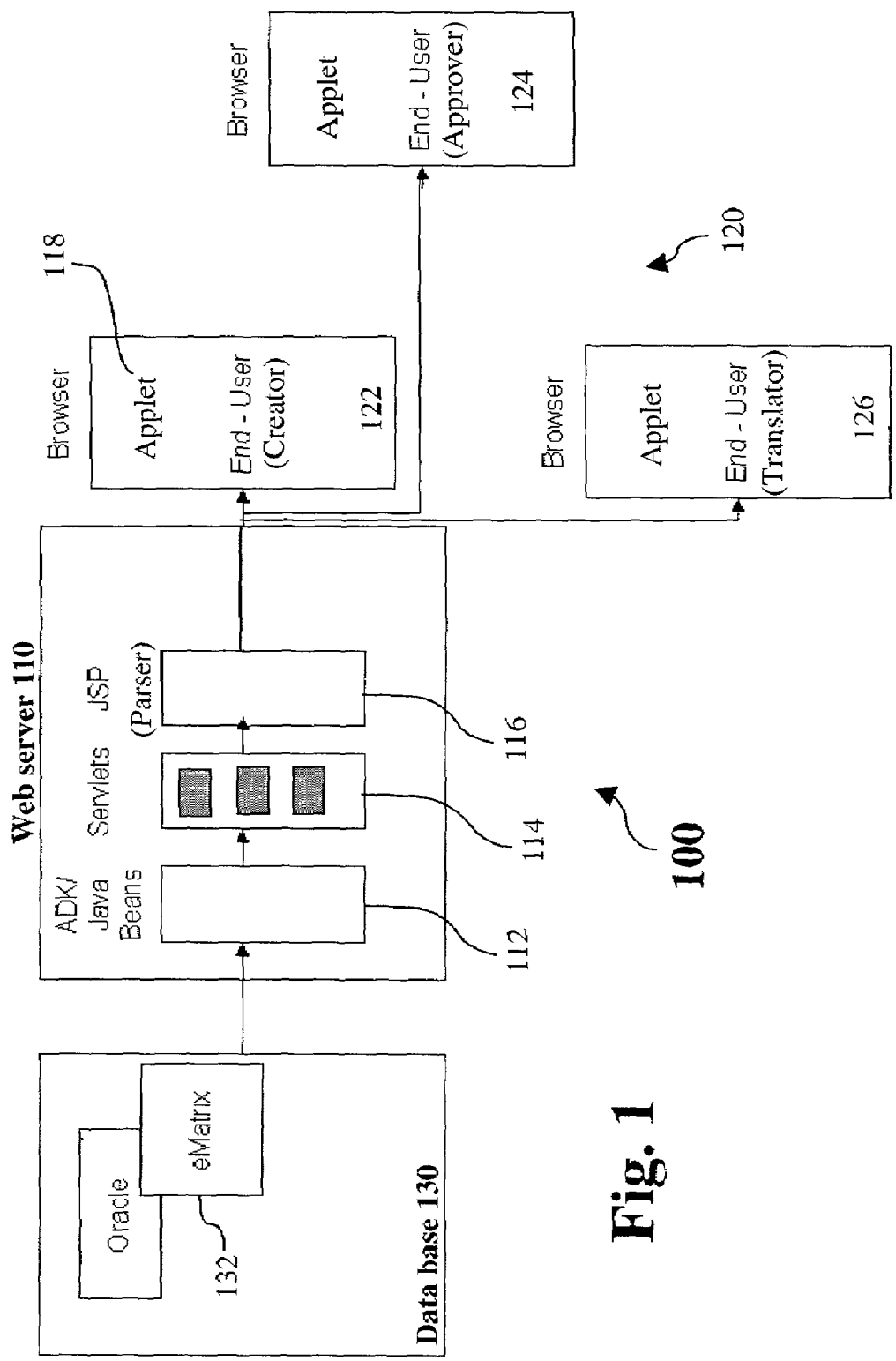
FIG. 1 is a block diagram showing the forms tool in accordance with one embodiment of the invention.

Hereinafter, aspects in accordance with various embodiments of the invention will be described. As used herein, any term in the singular may be interpreted to be in the plural, and alternatively, any term in the plural may be interpreted to be in the singular.

The invention is directed to the above stated problems, as well as other problems, that are present in conventional techniques. The foregoing description of various products, methods, or apparatus and their attendant disadvantages described in the in the "Background of the Invention" is in no way intended to limit the scope of the invention, or to imply that the invention does not include some or all of the various elements of known products, methods, and/or apparatus in one form or another. Indeed, various embodiments of the invention may be capable of overcoming some of the disadvantages noted in the "Background of the Invention," while still retaining some or all of the various elements of the products, methods, and apparatus in one form or another.

The invention provides a software tool to auto generate web based data forms for later use on the web without any programming. The web pages or forms are "live" in nature in that the data entry fields are linked back to a common database for archiving, storage and retrieval. The tool provides the user with a graphical user interface so that an average user, with no skills in Java, JSP or eMatrix, for example, can effectively create web pages and host them on a web site.

Making use of utilities provided in the software, web pages may be generated and deployed in a short period of time since the invention avoids manual processing by a software programmer. The implementation of the web page in terms of creating database structures, database connections, Java and JSP code, or eMatrix—ADK code, for example, is handled by the software behind the scenes and hidden from the user. The software dynamically maintains the layout created by the user, using the tool, on the web page. The invention provides for formatting, sizing, coloring, data validation, calculations and built-in workflow automation. Utility for easily translating the web page to a different language is available. Once a form is deployed over the web, all data entered into the form will be transferred to the backend database structures. This data can then be retrieved using the same web page or other applications can make use of this data for analysis and/or reporting.

Hereinafter, further aspects of the workings, in accordance with one embodiment of the invention, are described. The invention provides a web based application, i.e., a user can create web forms over the web and deploy them over the web. As a result, a user located at any part of the world can access the tool, and as a result, create forms, get the forms approved and deploy the forms on a suitable web server.

Additionally, data structures to hold the data in the fields of the form are automatically created by the wizard. There is no need for a database programmer to create the data structures. Further, the code for transaction is dynamically generated. There is no need for a programmer to code the transactions.

Further, web pages are dynamically generated by a built-in JSP parser, in accordance with one embodiment of the invention. The JSP parser converts the layout created by the user to a JSP page with all data validations dynamically. Scope for errors are reduced to minimum and extensive testing of forms is done away with.

A further benefit provided by the invention is that forms can be easily translated to any other languages supported by the tool. The tool supports any language with "Unicode" representation available. Different language versions of the form will be used at different locations. The data entered goes in to the same data structures and this enables standardization of forms as well. This data can later be used for all future analysis.

Further, the invention provides an organized workflow associated with generation of the form. This organized workflow may be performed in an automated manner. That is, after creation of the form, the form is then approved, and then deployed and/or translated, in accordance with one embodiment of the invention. This automation may be inbuilt into the form builder.

The invention may use any of a variety of security arrangements. The security may be based on the role of the user. The security may be in-built in the tool or implemented in some other manner. For example, the forms tool may utilize password arrangements and/or encryption techniques, for example.

Hereinafter, aspects of the operation of a "forms tool" 200 i.e., which might be characterized as a "forms wizard" in accordance with one embodiment of the invention will be described with reference to FIG. 1. FIG. 1 is a diagram showing the arrangement of the forms tool 200.

In accordance with one embodiment of the invention, two components of the forms wizard are a Java based applet 118, and a number of servlets 114 that run on the web server 110, which might use weblogic5.1, for example. The applet 118 runs on a client machine 120 when the tool 100 is accessed from the web and creates what might be characterized as a "form file." The form file may be designated as a ".top" file. The form file is described in further detail below.

This form file is transferred on to the web server 110 as a byte stream and from there to an eMatrix database 132, in accordance with one embodiment of the invention. The eMatrix database is disposed in a suitable data base arrangement 130. The data base arrangement 130 might also use other database technologies such as Oracle technology for example. This form file is the key to the forms tool 100 and contains information that enables the forms tool 100 to create a web page, database objects, auto-generated code, and also to read and write the forms in the tool.

Figure 2:
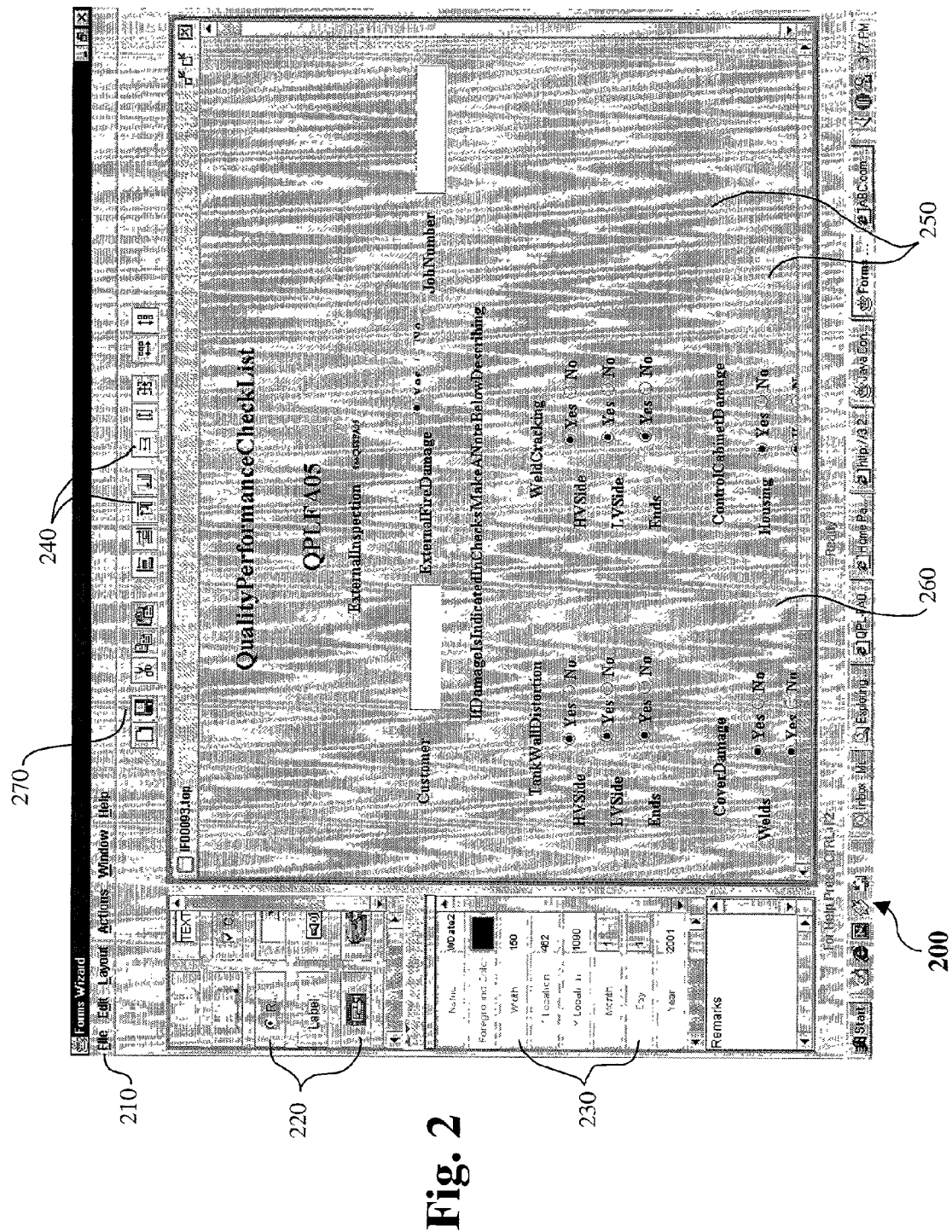
FIG. 2 is a graphical user interface (GUI), showing a form, generated by the forms tool in accordance with one embodiment of the invention.

The servlets 114 communicate back and forth with the eMatrix database 132 through a Remote Method interface server, or via some other suitable communication arrangement. The functionalities performed by the servlets 114 include file transfer, creation of database structure, sending electronic communication and deploying a form on to a specified webserver FIG. 2 is a diagram showing a Graphical User Interface (GUI) 200 in accordance with one embodiment of the invention. The user invokes the forms wizard 100 from the web, using a browser 120, and is presented with the GUI 200, such as the one shown in FIG. 2, over the web. In accordance with one embodiment of the invention, the GUI includes a menu bar 210, tool palette 220, properties pane 230, formatting palette 240, as well as a design space 250. A user, i.e., a "creator" user creates a form 260 in the design space 250.

The menu bar 210 contains various menus a user can utilize. The menu bar 210, in accordance with one embodiment of the invention, includes a file menu, edit menu, actions menu, windows menu and help menu. The list of menu options available in each of these menus and their functions are described in FIG. 3.

The GUI 200 also includes a tool palette 220. The tool palette 220 contains components that can be dragged and dropped to a main work area. These components may include a text field, label component, radio button, check box, table, list, text area, drop down list box, date, etc., for example, as well as other components. Some of the other features of the tool palette 220 may further include image, audio and video components. These components can be used to include an image, audio or video file as part of the form.

Figure 4:
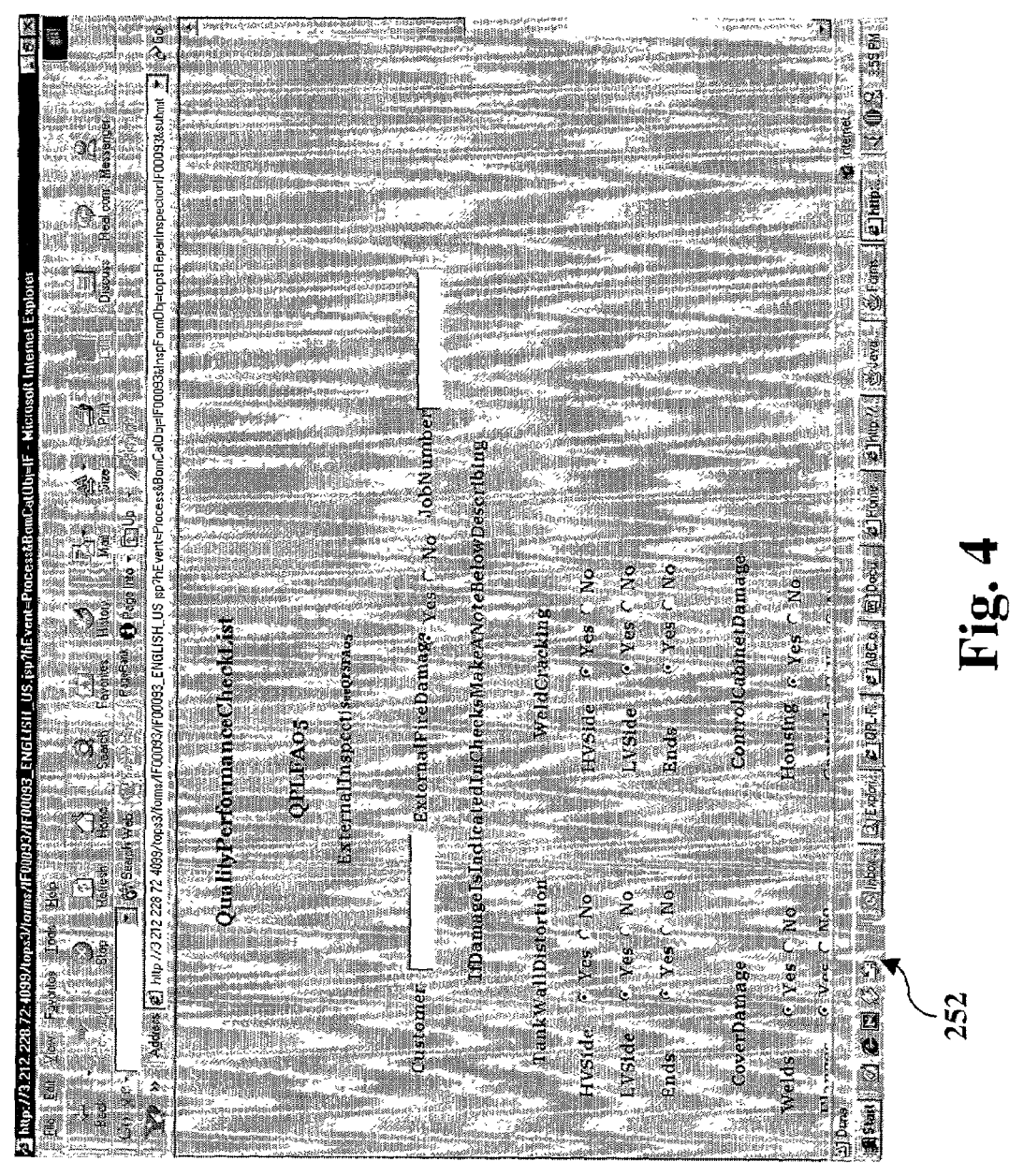

FIG. 4 is a graphical user interface 200' showing a prepared form 252 generated by the forms tool 100, after deployment of the form over the web, in accordance with one embodiment of the invention. The prepared form 252 illustratively includes various components provided by the tool palette.

With further reference to FIG. 2, the GUI 200 also includes a properties pane 230. The properties pane 230 contains the list of properties that can be set for a selected component, which has been placed in the form 260. These properties might include name, text, color, font, formula, or range, etc., for example. The list of properties available for each of the components is described in the table shown in FIG. 5.

Figure 10:
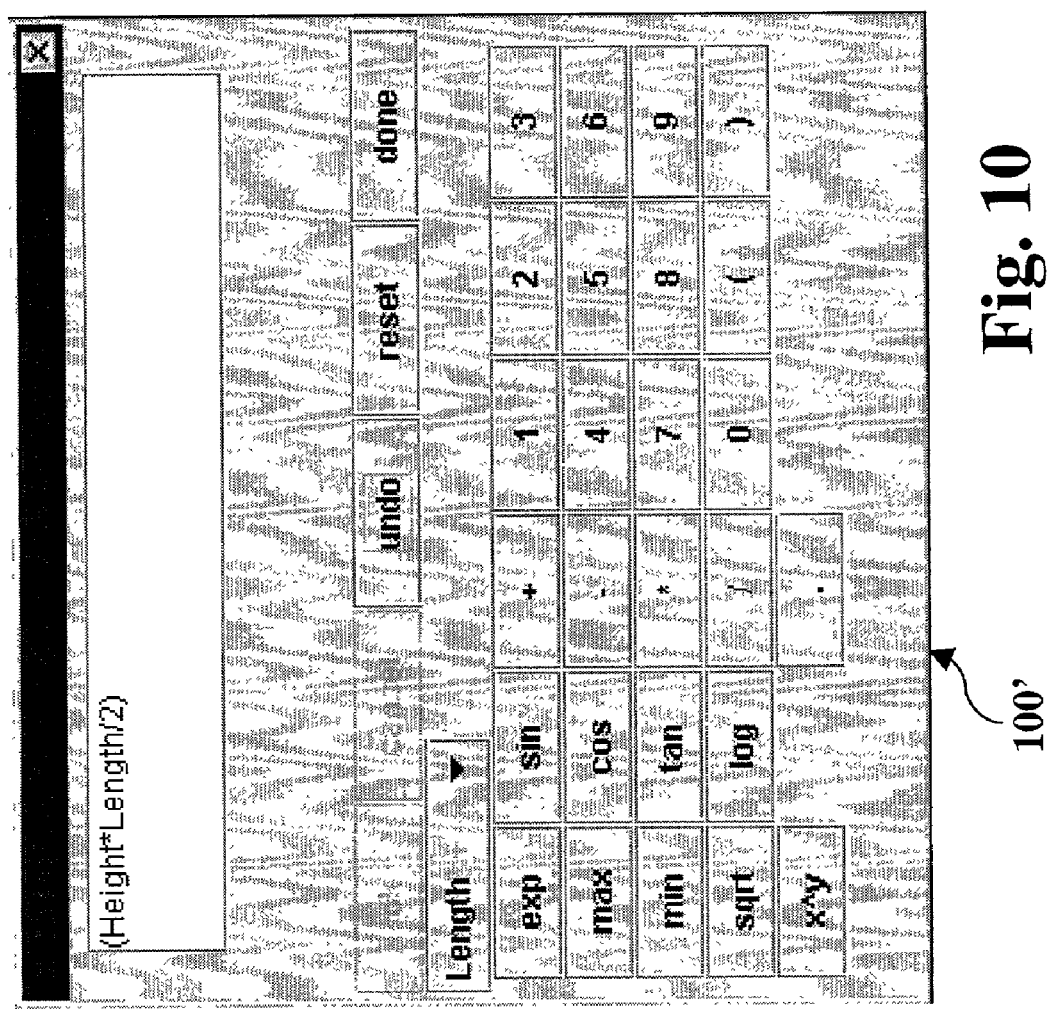
FIG. 10 is a calculator, which is included in the graphical user interface, presented to a user in accordance with one embodiment of the invention.

In accordance with one embodiment of the invention, the forms tool 100 may also provide data validation features for use by a creator user. Features that assist in data validation include the input required property, the data type property and the formula property. If the user sets the input required property of a field to YES then on the final web page this would be a mandatory field. If the user sets the data type of a field to a particular type, i.e. real, integer, boolean, etc., then only data of that type can be entered in that field. When the user clicks on the formula property he is provided with a dialog similar in look and feel to that of a calculator, as shown in FIG. 10. This can then be used to set formulas using different fields in the form and mathematical operators.

The GUI 200 also includes the formatting palette 240. The formatting palette 240 contains the shortcuts allowing edit features of the "components" and various menu options. Standard templates containing preformatted areas are also accessible from this area.

Further, the GUI 200 also includes the design space 250. The design space 250 is the area where the user creates the required form. The design space may utilize a MDI (Multiple Document Interface). Accordingly, the user can have access to two or more design spaces at the same time. This allows drag and drop capability between forms.

Hereinafter, the workflow of a form 260 will be described. In accordance with one embodiment of the invention, the life cycle of a form includes creation, approval/disapproval, deployment and translation. Access to the different life cycle stages is based on the role of the person, which is defined in a suitable database, such as an eMatrix database. A user may include any of a creator, approver, or translator, in accordance with one embodiment of the invention. Depending on the role, the user (creator, approver or translator) is provided with the relevant options on the menu lists in the tool.

FIG. 1 illustrates the various users of the form tool 100, in accordance with one embodiment of the invention, i.e., FIG. 1 shows users at browsers 120. As shown, a creator uses a creator browser 122. Further, an approver uses an approver browser 124. Also, a translator, as discussed below, may use a translator browser 126. Each of the browsers 120 may have a similar arrangement.

Figure 6:
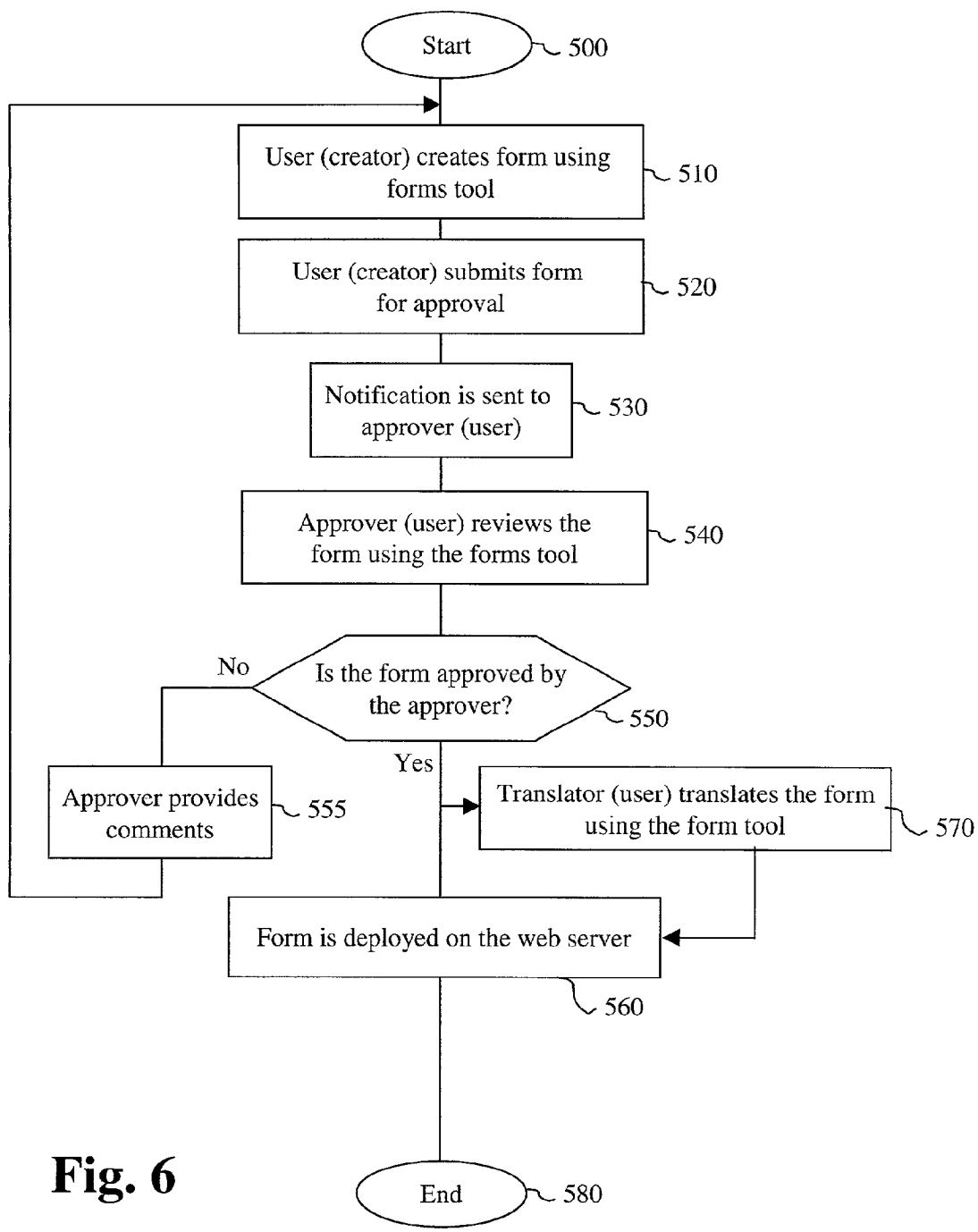
FIG. 6 is a flowchart showing a process used by the forms tool in accordance with one embodiment of the invention.

The basic workflow involved in the web form creation is described hereinafter with reference to FIG. 6. A user first invokes the 'Forms Wizard' (the forms tool 100) over the web using the creator browser 122, for example. Then, the creation process starts in step 500, as shown in FIG. 6. The creator creates a data form in step 510. After completion, in step 520, the creator sends the data form for approval to the approver, i.e., another user. Electronic notification may be sent to the approver in step 530. The approver, through the approver browser 124, reviews and verifies the form in step 540 and then either approves the form or returns it for revision to the creator with comments, as shown in step 550 of FIG. 6.

In the case the form is approved then it can be deployed to the web server in step 560. During deployment, the web page corresponding to the form is dynamically generated with the same layout as that created in the software with associated JSP and Java code, database connections, relevant data validation scripts, formulas and other features.

However, the approver may not approve the form, but might rather provide comments which are electronically communicated to the planner as shown in step 555 of FIG. 6. The process of FIG. 6 then returns to step 510. If the form is sent from the approver back to the creator for revision, then the creator, i.e., a planner, can incorporate the changes suggested by the approver. Then the creator resends the revised form back to the approver for approval.

Figure 7:
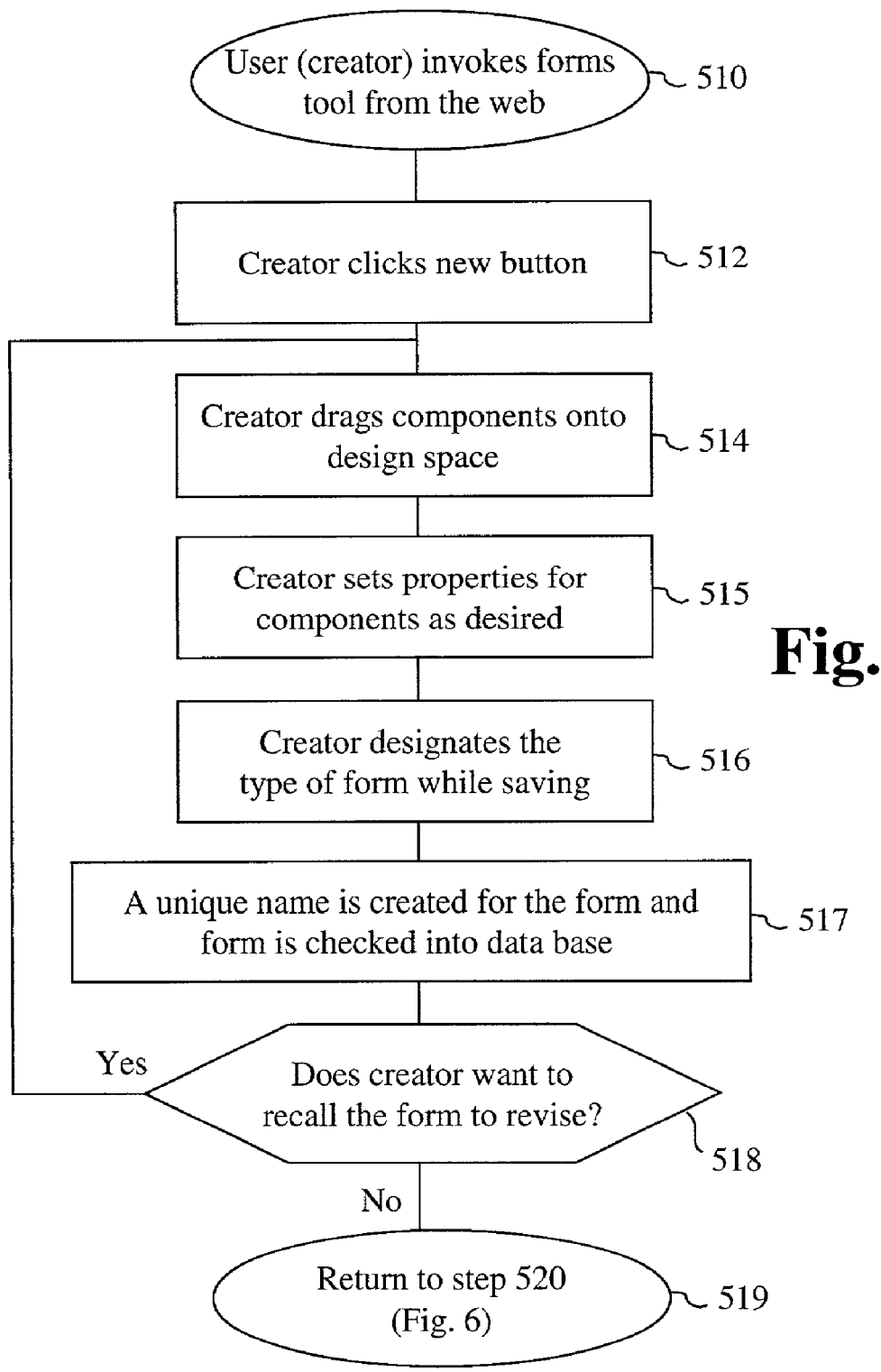
FIG. 7 is a flowchart showing aspects of preparation of a form in accordance with one embodiment of the invention.

Once the form is approved, the form may then be forwarded to a translator, as shown in step 570 of FIG. 6. The translator, who accesses the forms tool 100 via the translator browser 126, for example, can translate the form into a different language or languages. In accordance with one embodiment of the invention, the form is first created in English. This form may be characterized as a "base form." The base form can be translated by the translator to any other language for which Unicode support is available. Hereinafter, features relating to how the "forms wizard" works, and further details of creation of a form are described with reference to FIG. 7. FIG. 7 is a flowchart showing in further detail the "user (creator) creates form using the forms tool."

In accordance with one embodiment of the invention, the creator in step 512 of FIG. 7 clicks on a "new" button to create a new form. As a result, the user is presented with a blank design space. The user, and specifically in this case a creator, can drag components onto the design space in step 514, as required to create the form. Properties can then be set for each component in step 515. As described above, the properties might include data type, range of values, units that are allowable or the formula associated with a field. The formatting palette allows correct alignment or placement of components to efficiently make use of the space in the form. The copy and paste tool features provide the flexibility to import components from other pages with similar features and align them easily in terms of size and position.

After completing the form layout to meet functionality and appearance, the form is saved. Upon choosing the save option, the user, in step 516 of FIG. 7, is presented with several menu options to describe the type of form that was generated. At that point in the process, in step 517, a unique name is generated for the form and the form is checked into a suitable database, such as an e-matrix database, for example.

At some later time, if the user wants to recall the form to update or make additions, then the user can use an "open for edit" option and can search out the form making use of the search feature, as illustrated by step 518 of FIG. 7. After making the desired changes, the user can once again save the form. If two or more forms are very similar the user can use an "open for reuse" option and copy fields from one form to another easily.

After the creator has completed the form and no more changes are desired, the process passes from step 518 of FIG. 7 to step 519. In step 519, the process returns to step 520 of FIG. 6.

In further explanation of the invention, once the user has completed and saved the form, the user sends the form for approval using a "send for approval" option in actions menu. The system displays a popup window with the list of qualified "approvers" displayed. Once the user chooses the approver, an email approval request notification is sent to that individual. Internally the form moves from create state to review state in the database.

At this point in the process, the approver accesses the form through the forms wizard tool, as described above. The approver privileges are different than the creator privileges. That is, in accordance with one embodiment of the invention, the approver can only approve, return for revision or after approval deploy the form on a web server. Only after the form is approved, is the form then ready for deployment. On invoking the deploy function the form is deployed on a suitable web server. Once the deployment is done then the form can be used over the web for data entry or data display.

Once the deployment is done, further operations can be performed on the form by one or more translators. The translator can open the "source" forms that are already approved and translate them to another language. Changes in the labels, the static text of the fields, alignment, formatting and coloring are allowed. However, the translator cannot delete any fields or add new ones to the form, in accordance with one embodiment of the invention. This feature ensures standardization of forms around the world. Further, the data captured in forms of different languages use the same data structure and objects.

Hereinafter, aspects of internal implementation of the forms tool 100, in accordance with one embodiment of the invention, will be described. The internal implementation is explained below with reference to FIG. 8, which relates to behind the scenes auto coding.

As described above, the invention utilizes what might be characterized as a form file, which may be designated with the extension ".top". Further details of the form file are described below with reference to FIG. 9. To explain, when a creator user drags and drops various components on the design space and sets the properties for the components, all this information is stored in a temporary memory area in the forms tool 100. Specifically, the temporary memory will be in the user's machine, such as the creator browser 122 or approver browser 124, for example When the user clicks on save, the forms tool 100 creates a form file with the ".top" extension, in accordance with one embodiment of the invention.

This form file has a format unique to operation of the forms wizard tool 100 and has information relevant to creating the data page, the database objects and connections as well as loading the form back in the Forms Wizard tool.

Figure 8:
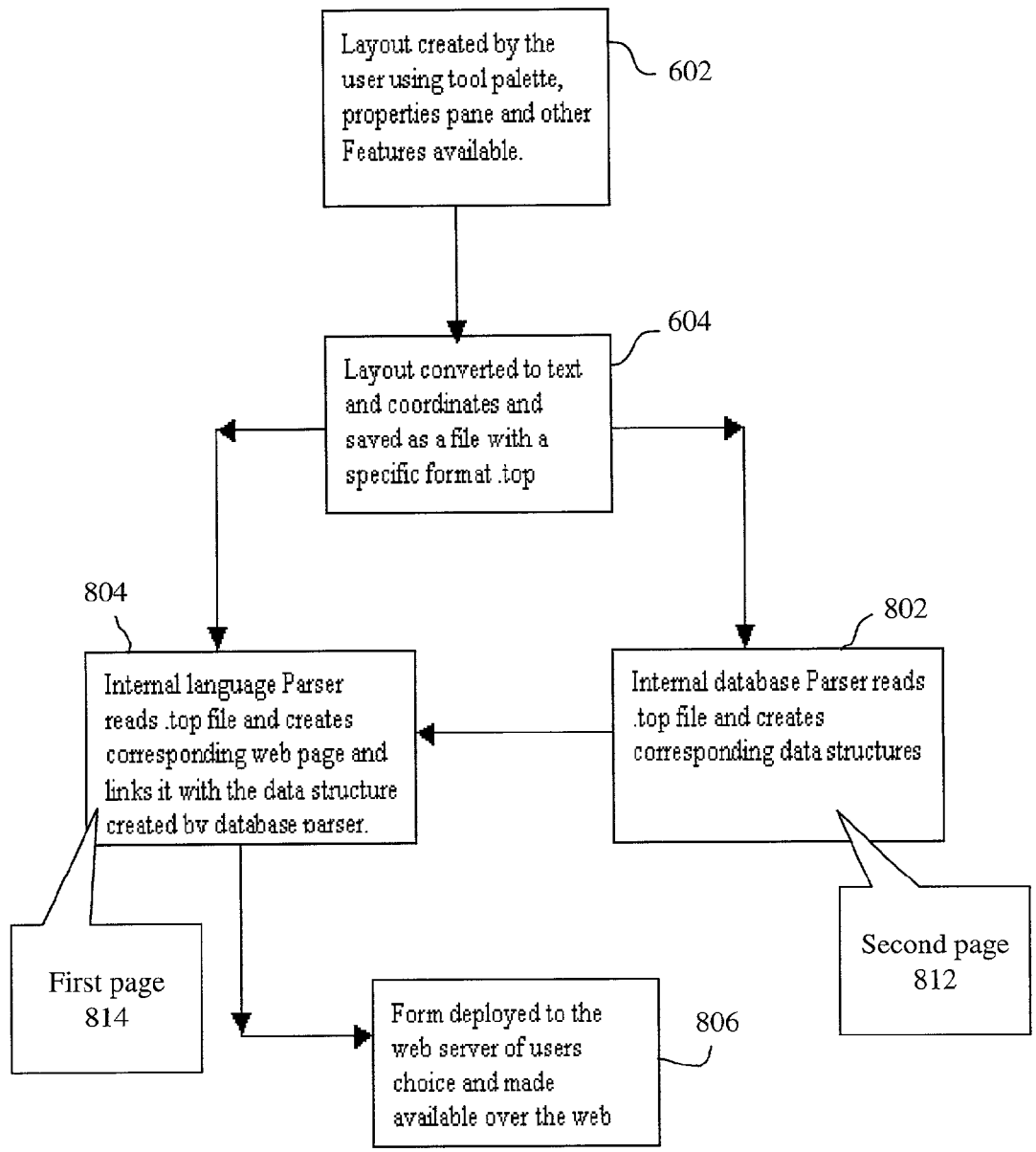
FIG. 8 is a flowchart showing in further detail the "user (creator) creates form using forms tool" in accordance with one embodiment of the invention.

As shown in step 602 of FIG. 8, a layout of a form is created by a user the tool palette, the properties pane and/or other features that are available. Then, the process passes from step 602 to step 604. In step 604, the various details of the layout of components in the form, including size and location details for example, are converted into text and coordinate data. The text and coordinate data, which is created, is saved as a file with the specific ".top" format, in accordance with one embodiment of the invention. Further, the text information is stored in "Unicode", i.e., so that the form file is language independent. Further aspects of FIG. 8 are described below.

Figure 9:
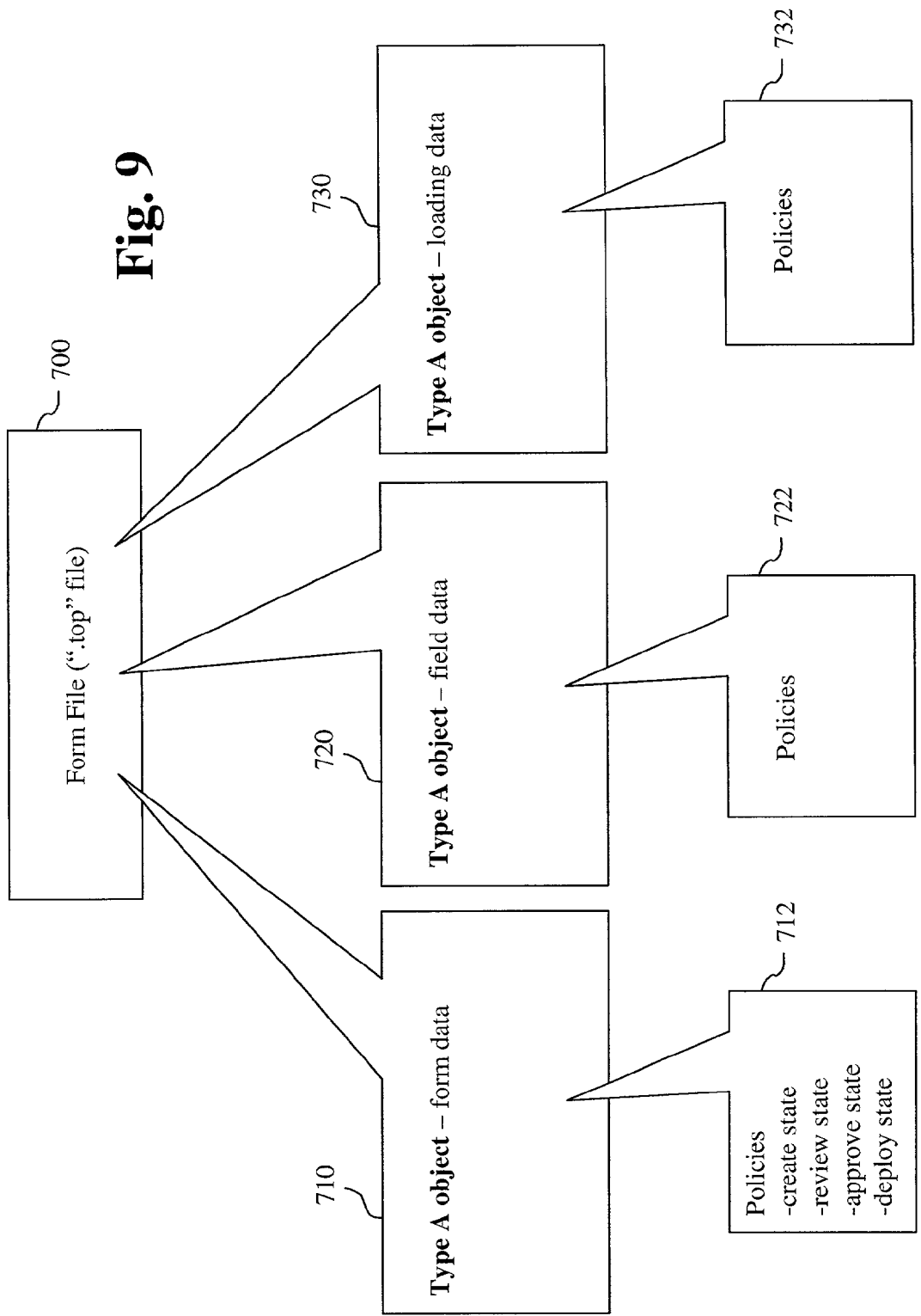
FIG. 9 is a diagram showing aspects of the form file (.top file) in accordance with one embodiment of the invention.

With reference to FIG. 9, implementation of the database used in accordance with one embodiment of the invention, and the dynamic generation of database objects, will be described. Illustratively, an EMatrix database might be used to implement the invention.

The invention creates a form file 700, as described above and shown in FIG. 9, with a ".top" extension,. The ".top" file created is used in the generation of an eMatrix database objects, in accordance with one embodiment of the invention.

There may be three types of data objects used. One type of data object is used to represent the form object, i.e., a type "A" data object 710. The second type of data object is used to represent all the fields in the form, i.e., a type "B" data object 720. A type "B" object has further subtypes to identify the data type of the field like real, integer etc. A third data object is used to invoke the form over the web, i.e., a type "C" data object 730.

Each of these types of data objects has respective policies (712, 722, 732) governing them. These policies control the life cycle of each object. For example, type A has a policy that has four states, i.e., create, review, approve, and deploy, that matches with the lifecycle of the data form. The data objects may also be provided with relationships with each other, which may help in storing values.

An object of a type A is created in the ematrix data base the first time a form is saved. The ".top" file for the form is checked in against that object. Every time this form is reopened in the tool the ".top" file is obtained from eMatrix, or some other suitable database, and interpreted by the tool. The associated layout is reloaded into the forms tool 100. The object is now in a "create state."

When the creator sends the form for approval the object gets promoted and gets a change of state to review. Additionally an electronic notification is sent to the approver. Only the approver is able to access the form at this point in the process. The approver accesses the form using the forms tool 100. On approval of the form, the form is promoted to the next state. On disapproval it gets demoted and the planner can make the modifications suggested by the approver.

In accordance with one embodiment of the invention, it is on approval that all the objects associated with the form are dynamically generated in the database by interpreting the form file 700. For each property defined in ".top" file, one of the subtypes of type B (or its subtypes) is instantiated and connected to the instance of type A of the eMatrix. A suitable relationship is provided to effect this connection.

With further reference to FIG. 8, aspects of the invention relating to use of a parser 116, as shown in FIG. 1, and auto creation of web pages and database related code, will be described in accordance with one embodiment of the invention. For example, a JSP parser 116 might be used. Once the form is approved, the form can be deployed on the web server 110. The parser 116 can be inbuilt into the forms wizard.

After the form is approved, the form file (described above in step 604 of FIG. 8) is deployed. The approval allows access by a translator, for example. During deployment, the parser 116 of the wizard parses the ".top" file and creates two pages dynamically, as illustrated in FIG. 8. The two pages might be two JSP pages, for example.

As shown in step 802 of FIG. 8, the internal language parser 116 reads the top file and creates corresponding data structures. Further, in step 804, the internal language parser reads the .top file and creates a corresponding web page. The parser 116 then links the corresponding web page with the data structure, i.e., the data structure that is created in step 802.

To further explain, when the user enters data on the first page 814, the first page talks to the second page, which in turn transfers the data into the database 130. The first page has the presentation logic as created by the user on the forms tool 100. This is achieved by reading the coordinates of the components that are stored in the ".top" file for the particular form. The parser 116 generates java script functions, for example, for the validations of data type and checks whether the field is mandatory or not. The parser 116 also enables or disables components as specified in the ".top" file, sets the color and font of components and creates a java script based formula associated with a component, for example.

The second page 812 has the necessary logic for database interaction. This page 812 has the auto-generated code for data base communication. The page 812 creates a relationship between the instance of Type C and the various instances of Type B (the components) and stores the values as attributes of this relationship. This data can then be retrieved using the same JSP page. Further, other applications can use this data for analysis and reporting.

Hereinafter, aspects of multilingual implementation will be described in accordance with one embodiment of the invention. Once a form is approved the form can be translated to other languages. When the translator opens the form for translation he or she can change the text from English to that of his local language. She cannot add or delete any fields. When she saves the form, these language additions are written into the ".top" file. The ".top" file will have different sets of properties written for each language. Whenever a form is saved, all the text that is meant for translation is stored as Unicode characters in the '.top' file, in accordance with one embodiment of the invention. The ".top" file is again used for generation of JSP pages. At the point of displaying the JSP pages, all the Unicode characters are converted to their actual representation for viewing by the user. In accordance with one embodiment of the invention, the encoding may be set to UTF8 format in the JSP page to allow proper representation of the characters in their respective languages.

The invention also provides a search feature. A user of the tool can search for forms that are already created. This searching might be needed for editing a form, approving, translation, deployment of a form or reuse of form. In accordance with one embodiment of the invention, the basic search will be on the form name and the description of the form. The user could narrow his search based on a business segment and component, for example. An eMatrix mql query is generated based on criteria such as, for example, the purpose of opening the form, classification of the form for business needs, form name, description of the form, etc., for example. This query returns relevant results to the user.

Accordingly, the tool is capable of creating forms in any language and creating JSP pages in respective languages as long as the user can input that particular character set through his keyboard. The objects in the translated form also point to the same as for English. As a result, the standardization objective is met globally.

The invention provides various advantages. The cycle time for form creation is substantially reduced. Further, the cycle time for overall workflow is reduced, i.e., including such operations as form creation, sending the form for approval, making changes to the form if not approved, and deploying the form over the web. The workflow may be highly automated into the tool.

A further advantage is the user only needs to know how to create the layout for the form using the tool. The rest is all hidden from the user, thus eliminating the need for programming knowledge. Since there is no coding effort required, minimum time is needed for testing. Also, chances for errors are reduced to a minimum. Web pages can be created as and when needed. Also, forms can be easily made available in other languages.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A method for creating a form comprising:
providing a graphical user interface including a plurality of selectable components and a design space;
a creator selecting at least one of the selectable components and disposing each of the selected selectable components in the design space to generate a form layout;
converting the form layout to data information using JSP processing; and
saving the data information to a form file, the form file being output to a database over a network; and
further including retrieving the form file from the database, the data information in the form file including text information and coordinate information;
reading the form file and creating corresponding data structures based on reading the form file; and
reading the form file and creating a web page, the web page created in conjunction with linking the web page with the corresponding data structures; and
wherein reading the form file and creating corresponding data structures based on reading the form file is performed by a database parser in a web server; and
reading the form file and creating the web page, the web page created in conjunction with linking the web page with the corresponding data structures, is performed by a language parser.

2. The method of claim 1, further including:
deploying the form file from the database to the web server; and
generating the web page based on the form file in the web server.

3. The method of claim 2, wherein deploying of a generated web page includes validating inputs to the form, by a user.

4. The method of claim 2, wherein the generating the webpage includes creating scripts to execute mathematical expressions on components.

5. The method of claim 1, wherein saving the data information to a form file includes providing the form file to the web server, the web server outputting the form file to a data base.

6. The method of claim 1, the method further including:
the creator providing the form for access by an approver;
the approver accessing the form generated by the creator, a tool displaying the form layout and form characteristics, the approver reviewing the form to determine if the form is acceptable.

7. The method of claim 6, wherein an alert is sent to the approver to alert the approver that the form is ready for review by the approver.

8. The method of claim 6, wherein the approver approves and deploys the form; and
the method further including providing the form to a translator for translation.

9. The method of claim 8, wherein each of the creator, the approver and the translator access the form, using the form file, using a web browser.

10. The method of claim 1, the form file further including a state status, the state status designating the status of the form as one of a create state, a review state, an approve state and a deploy state.

11. The method of claim 1, wherein the form file includes information related to creation of the form, database objects and connection, and web loading data.

12. The method of claim 1, wherein the form file includes:
a type A object that represents the form object;
a type B object that represents the fields in the form; and
a type C object that represents loading information of the form.

13. The method of claim 12, where each of the type A object, the type B object and the type C object is associated with policies.

14. The method of claim 1, wherein disposing each of the selected selectable components in the design space includes dragging a selected selectable component into the design space.

15. The method of claim 1, wherein creation of the form includes providing for attaching mathematical expressions on selected selectable components on the form through the graphical user interface.

16. The method of claim 1, wherein the saving of data information includes transferring the form file, through a compressed byte stream, to the database.

17. A system for creating a form comprising:
a web browser, the web browser providing a graphical user interface including a plurality of selectable components and a design space, the graphical user interface providing for a user to select at least one of the selectable components and to dispose each of the selected selectable components in the design space to generate a form layout that represents the form, the web browser converting the form layout to data information;
a web server, the web server saving the data information to a form file; and
a database, the form file being output to the database over a network; and
wherein the form file is read by a database parser and corresponding data structures are created based on reading the form file; and
the form file is read by a language parser and a web page is created, the web page created in conjunction with linking the web page with the corresponding data structures.

18. The system of claim 17, wherein the data information includes text information and coordinate information.

19. The system of claim 17, wherein the providing for a user to select at least one of the selectable components and to dispose each of the selected selectable components in the design space includes dragging a selected selectable component into the design space.

20. The system of claim 17, wherein the web browser is accessible by a creator user, an approver user, and a translator user, each of the creator user, the approver user, and the translator user accessing the form by retrieving the form file from the database.

21. The system of claim 20, wherein the approver user receives an alert once the creator user has completed the form; and
the translator user is provided access to the form after the approver user approves the form.

22. A method for creating a form comprising:
providing a graphical user interface including a plurality of selectable components and a design space;
a creator selecting at least one of the selectable components and dragging each of the selected selectable components into the design space to generate a form layout, the user selecting a property of at least one of the selected selectable components;
converting the form layout to data information;

saving the data information to a form file, the form file being output to a database over a network, the saving the data information to a form file including providing the form file to a web server, the web server outputting the form file to the data base; and retrieving the form file from the database, the data information in the form file including text information and coordinate information;

reading the form file and creating corresponding data structures based on reading the form file; and reading the form file and creating a web page, the web page created in conjunction with linking the web page with the corresponding data structures.

23. A system for creating a form comprising:

a web browser, the web browser providing a graphical user interface including a plurality of selectable components and a design space, the graphical user interface providing for a user to select at least one of the selectable components and to dispose each of the selected selectable components in the design space to generate a form layout that represents the form, the web browser converting the form layout to data information;

a web server, the web server saving the data information to a form file; and a database, the form file being output from the web server to the database over a network; and wherein the data information includes text information and coordinate information; and wherein the form file is read by a database parser and corresponding data structures are created based on reading the form file; and the form file is read by a language parser and a web page is created, the web page created in conjunction with linking the web page with the corresponding data structures; and wherein the providing for a user to select at least one of the selectable components and to dispose each of the selected selectable components in the design space includes dragging a selected selectable component into the design space.

* * * * *